US006913155B2

(12) United States Patent
Bryant (10) Patent No.: US 6,913,155 B2
(45) Date of Patent: Jul. 5, 2005

(54) APPARATUS FOR TRAPPING FLOATING AND NON-FLOATING PARTICULATE MATTER

(76) Inventor: Graham John Bryant, 123 Linden Ave., Westfield, NJ (US) 07090

(*) Notice: Subject to any disclaimer, the term of this patent is extended or adjusted under 35 U.S.C. 154(b) by 152 days.

(21) Appl. No.: 10/247,875

(22) Filed: Sep. 20, 2002

(65) Prior Publication Data

US 2004/0055950 A1 Mar. 25, 2004

(51) Int. Cl.$^7$ ............................................. B01D 17/025
(52) U.S. Cl. .................. 210/521; 210/532.1; 210/532.2
(58) Field of Search ................................ 210/170, 521, 210/532.1, 532.2

(56) References Cited

U.S. PATENT DOCUMENTS

| | | | |
|---|---|---|---|
| 1,115,016 A | 10/1914 | Pheils | |
| 1,579,205 A | 4/1926 | Blakesley et al. | |
| 2,178,240 A | 10/1939 | Pascale | 183/112 |
| 2,764,545 A | 9/1956 | Primich | 210/6 |
| 2,915,188 A | 12/1959 | Buker | 210/447 |
| 3,126,333 A * | 3/1964 | Williams | 210/617 |
| 3,681,562 A | 8/1972 | Winzen | 210/94 |
| 3,834,539 A | 9/1974 | Thompson | 210/67 |
| 4,132,651 A | 1/1979 | deJong | 210/522 |
| 4,187,182 A | 2/1980 | Rosenberg | 210/445 |
| 4,202,778 A | 5/1980 | Middelbeek | 210/522 |
| 4,257,895 A | 3/1981 | Murdock | 210/243 |
| 4,689,145 A | 8/1987 | Matthews et al. | 210/170 |
| 4,700,412 A | 10/1987 | Manuel | 4/207 |
| 4,806,237 A | 2/1989 | Ewald, Jr. | 210/169 |
| 4,832,846 A | 5/1989 | Gavin | 210/532 |
| 4,834,879 A | 5/1989 | Stegall et al. | 210/205 |
| 4,997,562 A | 3/1991 | Warner | 210/259 |
| 5,091,315 A | 2/1992 | McCarty et al. | 435/287 |
| 5,234,589 A | 8/1993 | Sussich et al. | 210/297 |
| 5,236,585 A * | 8/1993 | Fink | 210/242.3 |
| 5,266,191 A | 11/1993 | Greene et al. | 210/195 |
| 5,397,464 A | 3/1995 | Hannon | 210/163 |
| D357,737 S | 4/1995 | Spearman | D24/162 |
| 5,409,604 A | 4/1995 | Graves | 210/198 |
| 5,433,845 A | 7/1995 | Greene et al. | 210/170 |
| 5,445,730 A | 8/1995 | Pattee | 210/167 |
| 5,498,331 A | 3/1996 | Monteith | 210/170 |
| 5,554,277 A | 9/1996 | Rief et al. | 210/94 |
| 5,575,909 A | 11/1996 | Foster | 210/304 |
| 5,690,813 A | 11/1997 | Coale | 210/86 |
| 5,725,760 A | 3/1998 | Monteith | 210/170 |
| 5,753,115 A | 5/1998 | Monteith | 210/170 |
| 5,759,415 A | 6/1998 | Adams | 210/776 |
| 5,800,702 A | 9/1998 | Taylor-McCune et al. | 210/162 |
| 5,879,545 A | 3/1999 | Antoun | 210/90 |
| 5,928,524 A | 7/1999 | Casola | 210/802 |
| 6,062,767 A | 5/2000 | Kizhnerman et al. | 405/39 |
| 6,068,765 A | 5/2000 | Monteith | 210/170 |
| 6,120,684 A | 9/2000 | Kistner et al. | 210/163 |
| 6,126,817 A | 10/2000 | Duran et al. | 210/123 |
| 6,177,004 B1 | 1/2001 | Bracone | 210/86 |
| 6,183,633 B1 | 2/2001 | Phillips | 210/170 |
| 6,190,545 B1 | 2/2001 | Williamson | 210/155 |
| 6,221,243 B1 | 4/2001 | Flanagan | 210/163 |
| 6,241,881 B1 | 6/2001 | Pezzaniti | 210/155 |
| 6,264,835 B1 | 7/2001 | Pank | 210/170 |
| 6,371,690 B1 | 4/2002 | Monteith | 405/39 |

* cited by examiner

Primary Examiner—Robert A. Hopkins
(74) Attorney, Agent, or Firm—Sutherland Asbil & Brennan LLP (57) ABSTRACT

The present invention may include a separation tank with an outer chamber and an inner chamber positioned within the outer chamber. An inlet and an outlet may be in communication with the outer chamber. A first opening may provide access between the inner chamber and the outer chamber. An inlet channel may extend between the inlet to a second opening in the inner chamber. A plurality of lower baffles positioned between the outer chamber and the inner chamber and adjacent to the first opening may be included. A plurality of upper baffles positioned between the outer chamber and the inner chamber and adjacent to the outlet may be included. Floating and non-floating particulate matter may be trapped in the separation tank as storm water flows through the apparatus.

45 Claims, 9 Drawing Sheets

APPARATUS FOR TRAPPING FLOATING AND NON-FLOATING PARTICULATE MATTER

TECHNICAL FIELD

The present invention relates generally to a device for trapping particulate matter in a liquid piping system. More specifically, the present invention relates to a device for trapping both floating and non-floating particulate matter flowing through a storm water sewer system.

BACKGROUND OF THE INVENTION

It is commonplace to see unsightly trash at storm water system outlets or in streams or other areas where discharged storm water may flow. Many types of equipment and processes have been suggested for dealing with this problem.

For example, many devices have been intended to trap both floating and non-floating debris. These devices, however, may be complex, multi-chambered devices that are expensive to produce, install, and maintain. An example of such a device is shown in U.S. Pat. No. 5,759,415, which describes a multi-chambered device for separating floating and non-floating particulate matter from storm water. This complex device has four separate chambers and numerous types of openings to provide for flow between the chambers. Furthermore, the chambers must be aligned in an ordered, consecutive manner such that it may be difficult and more expensive for the device to connect storm water lines that are not aligned linearly.

Other devices may incorporate screens or filters to remove debris. Although effective and less complex as the devices described above, such devices are prone to clogging and may require regular maintenance to prevent such. These devices further may require periodic replacement of the filtering material. Other types of devices have proven impractical at meeting the needs of the industry because of the inflexibility of their designs, the costliness of their production, or the difficulties associated with their installation and maintenance.

Thus, there is a desire for an efficient and cost effective means for trapping debris in storm water. Preferably, such an apparatus may prove effective at trapping both floating and non-floating particulate matter. Such an apparatus should be simple in its design and be able to be produced at low cost. The device may prove flexible in varying field conditions, i.e., able to satisfy varying size and height requirements and able to connect efficiently the non-linear junction points that inevitably occur in piping systems. Finally, such a device should be easy to maintain and not be prone to clogging or need the regular changing of filtering materials.

SUMMARY OF THE INVENTION

It is an object of the present invention to remove floating and non-floating particulate matter from storm water in a cost effective and efficient manner. In certain embodiments, the separation tank of the present invention may include an outer chamber and an inner chamber positioned within the outer chamber. An inlet and an outlet may be in communication with the outer chamber. A first opening may provide access between the inner chamber and the outer chamber. An inlet channel may extend between the inlet to a second opening in the inner chamber. A plurality of lower baffles positioned between the outer chamber and the inner chamber and adjacent to the first opening may be included. A plurality of upper baffles positioned between the outer chamber and the inner chamber and adjacent to the outlet may be included.

The separation tank may further include a floor, and the inner chamber and the outer chamber may be positioned on the floor. The outer chamber may be a cylinder. The inner chamber may be a cylinder. The inlet, the second opening, and the outlet may be positioned in a first position range, and the first opening may be positioned in a second position range. The first position range may be higher than the second position range. The first opening may be positioned adjacent to the floor. The inlet, the second opening, and the outlet may be each separated from the first opening by at least a mid-section of the inner chamber wall. The first opening may be a substantially rectangular shape.

The plurality of lower baffles may further be affixed to the floor and extend higher than the first opening. The plurality of lower baffles may flank the first opening so as to form a first basin between the inner chamber and the outer chamber. The plurality of upper baffles may be separated from the floor by a predetermined distance and extend higher than the outlet. The plurality of upper baffles may flank the outlet so as to form a second basin between the inner chamber and the outer chamber. The inlet channel may consist of a lower section of a horizontal running pipe. The outer chamber may consist of a plurality of hollow cylindrical segments. The inner chamber may consist a plurality of hollow cylindrical segments. The outer chamber may include a removable lid. The outer chamber may be a first height and the inner chamber wall may be a second height. The first height may be greater than the second height, and the inner chamber may be open.

In other embodiments, the separation tank may include an outer chamber and an inner chamber positioned within the outer chamber. An inlet may be in communication with the inner chamber. An outlet may be in communication with the outer chamber. An inner-chamber-wall-opening may provide access between the inner chamber to the outer chamber. The outer chamber may be a cylinder. The inner chamber may be a cylinder. The separation tank may include a floor, and the inner chamber and the outer chamber may be positioned on the floor. The inlet and the outlet may be positioned at a first position range, and the inner-chamber-wall-opening may be positioned at a second position range. The first position range may be higher than the second position range. The inlet and the outlet may be each separated from the inner-chamber-wall-opening by at least a mid-section of the inner chamber wall. The inner-chamber-wall-opening may be separated from the floor by at least a lower-section of the inner chamber wall.

The inner-chamber-wall-opening may include a plurality openings, and two of the plurality of the inner-chamber-wall-openings may oppose each other across the inner chamber. Each of the plurality of inner-chamber-wall-openings may be a substantially circular shape. The two of the plurality of inner-chamber-wall-openings may comprise a first axis, and the inlet and the outlet may comprise a second axis. The first axis and the second axis may be substantially perpendicular. The outer chamber may consist of a plurality of hollow cylindrical segments. The inner chamber may consist of a plurality of hollow cylindrical segments. The outer chamber may include a removable lid. The outer chamber may include a first height, and the inner chamber wall may include a second height. The first height may be greater than the second height, and the inner chamber may be open.

In other embodiments, the separation tank may include an outer chamber and an inner chamber positioned within the outer chamber. An inlet may be in communication with the outer chamber. An outlet may be in communication with the inner chamber. An inner-chamber-wall-opening may provide access between the inner chamber to the outer chamber. The outer chamber may be a cylinder. The inner chamber may be a cylinder. The separation tank may include a floor, and the inner chamber and the outer chamber may be positioned on the floor. The inlet and the outlet may be positioned at a first position range, and the inner-chamber-wall-opening may be positioned at a second position range. The first position range may be higher than the second position range. The inlet and the outlet may be each separated from the inner-chamber-wall-opening by at least a mid-section of the inner chamber wall. The inner-chamber-wall-opening may be separated from the floor by at least a lower-section of the inner chamber wall.

The inner-chamber-wall-opening may be a substantially rectangular shape. The inner chamber may include a first side and a second side, and the inner-chamber-wall-opening may be positioned on the first side and the inlet may face the second side. The outer chamber may consist of a plurality of hollow cylindrical segments. The inner chamber may consist of a plurality of hollow cylindrical segments. The outer chamber may include a removable lid. The outer chamber may include a first height, and the inner chamber wall may include a second height. The first height may be greater than the second height, and the inner chamber may be open.

These and other features of the present invention will become apparent upon review of the following detailed description of the present embodiments of the separation tank, when taken in conjunction with the drawings and the appended claims.

DETAILED DESCRIPTION OF EXEMPLARY EMBODIMENTS

Figure 1:
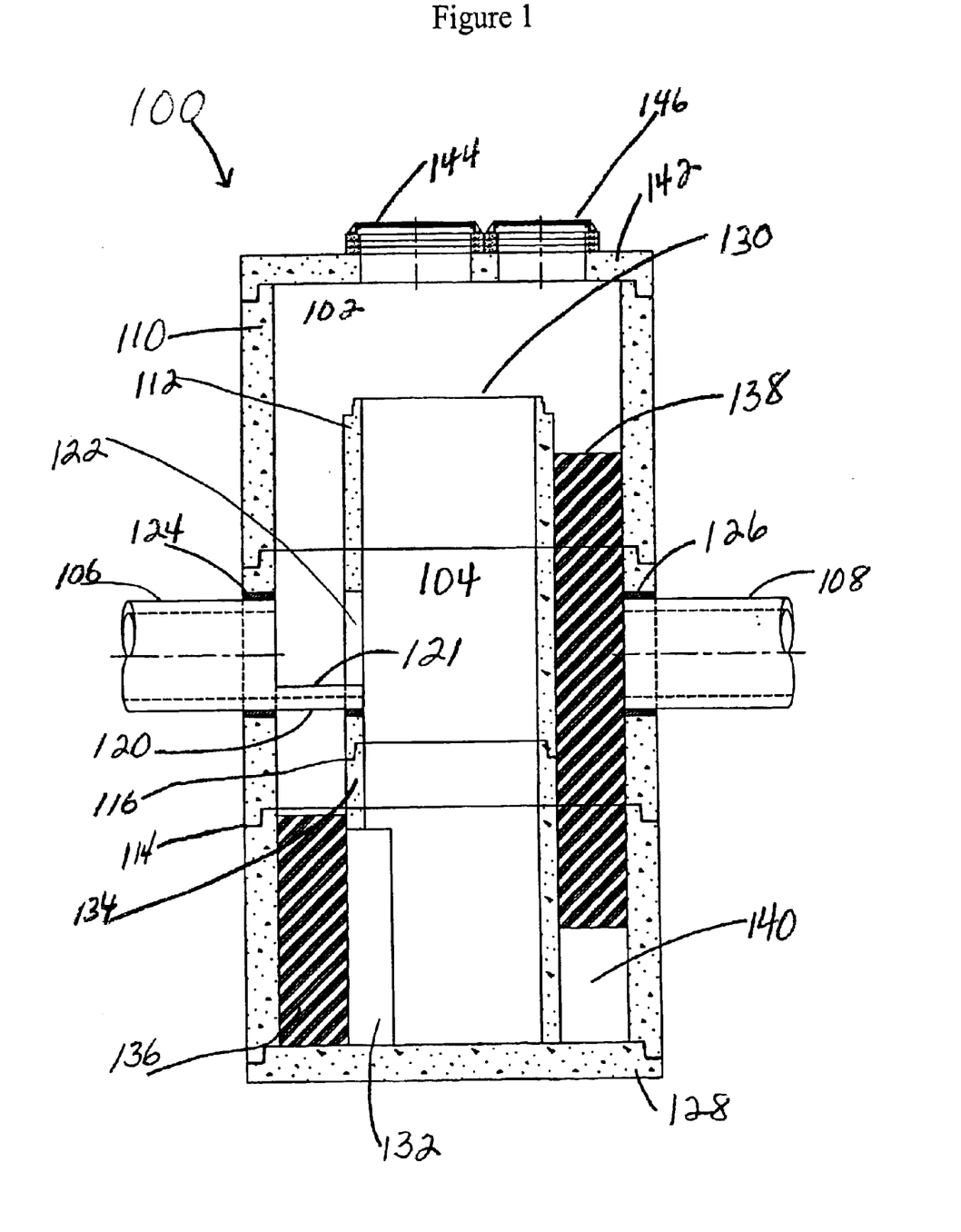
FIG. 1 is a side cross-sectional view of a separation tank of the present invention.
Figure 2:
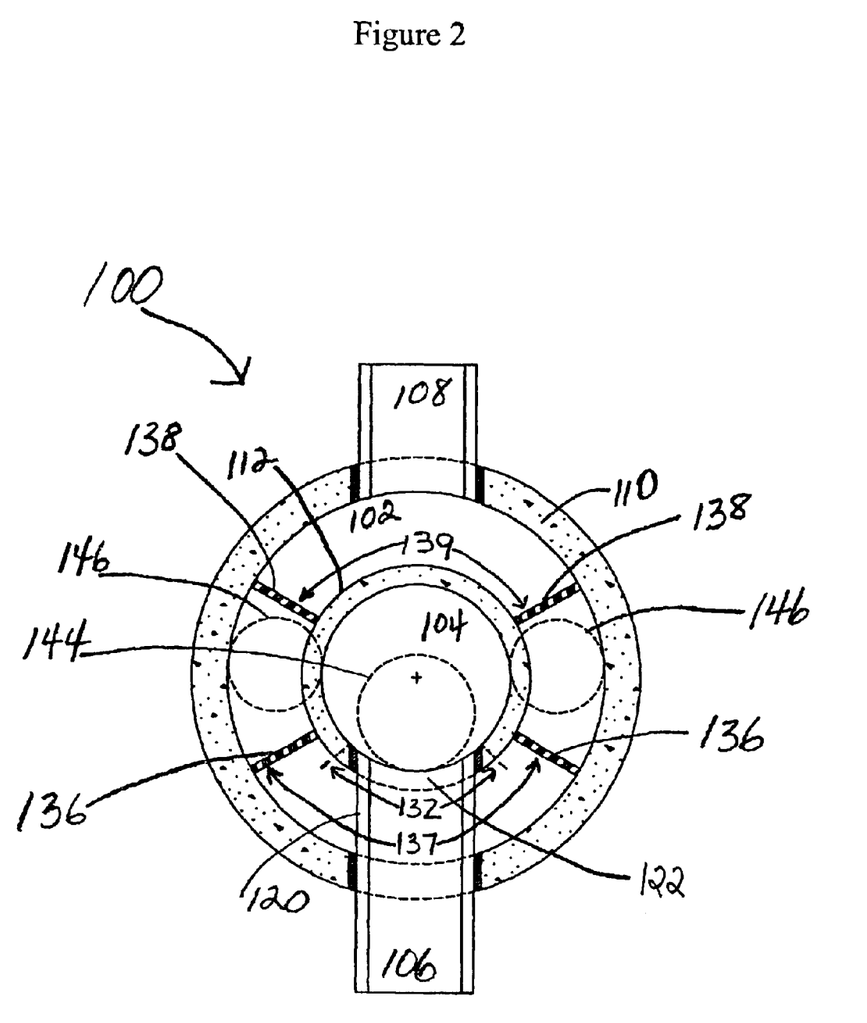
FIG. 2 is a top plan view of the separation tank of FIG. 1.
Figure 3:
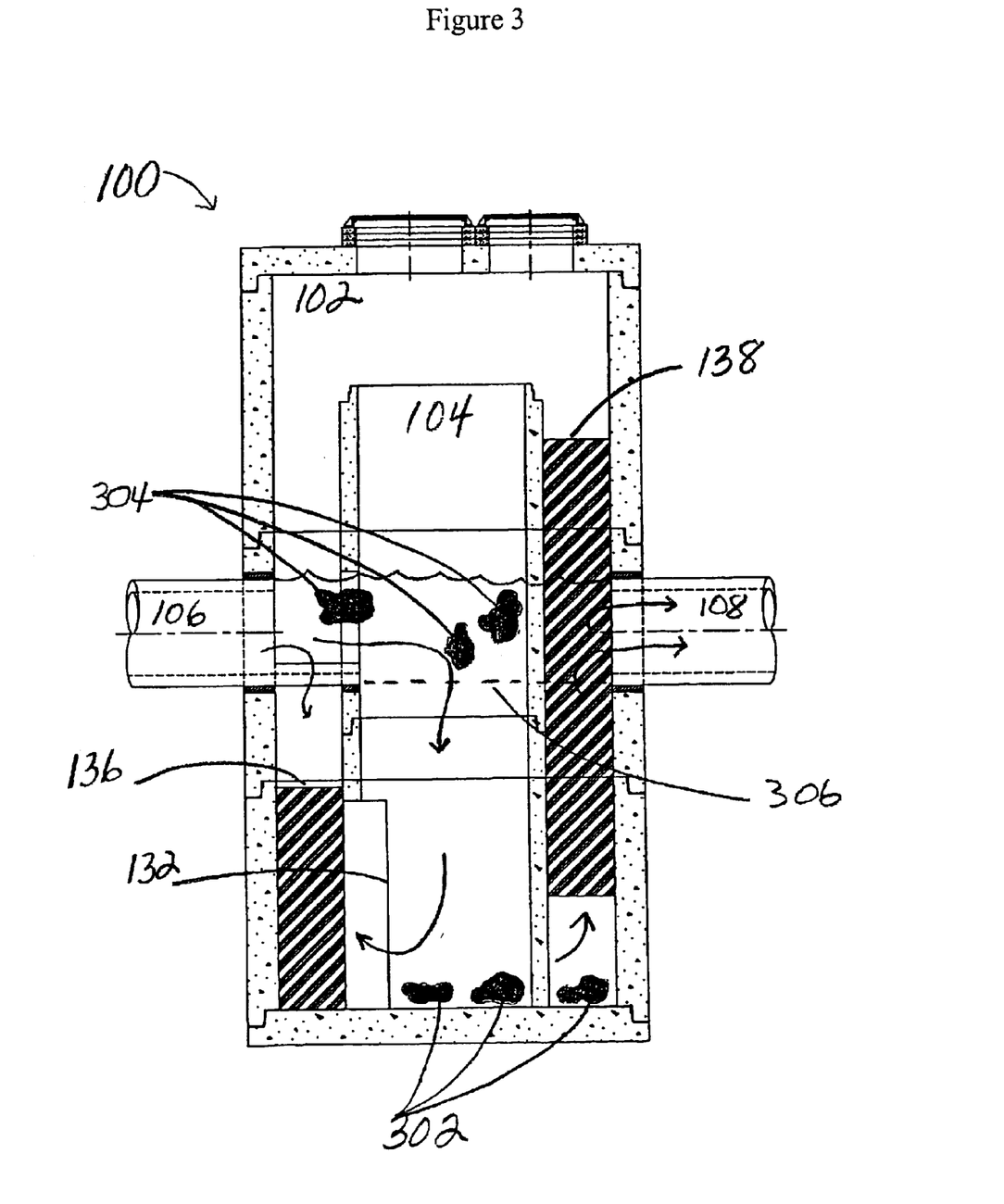
FIG. 3 is side cross-sectional view of the separation tank of FIG. 1 showing the device in use.

Referring now to the figures, where the various numbers represent like parts throughout the several views, FIGS. 1–3 show one embodiment of the separation tank of the present invention, a separation tank 100. The separation tank 100 may include an outer chamber 102, and inner chamber 104, an inlet 106, an outlet 108, and other features to be described below. The separation tank 100 may be constructed out of pre-cast concrete, fiberglass, plastic, steel, or similar types of materials. The selection of the materials is not essential to the invention as a whole.

The outer chamber 102 may be defined by an outer chamber wall 110. The outer chamber wall 110 may have a substantially cylindrical shape, as is shown. The inner chamber 104 may be defined by an inner chamber wall 112. Preferably, the inner chamber wall 112 may form substantially the same shape as the outer chamber wall 110, though this may not be necessary. As shown, the inner chamber wall 112 also may form a cylindrical shape. The outer chamber wall 110 may be constructed with stacked cylindrical segments that may be joined at overlapping segment joints 114. The segment joints 114 of the outer chamber wall 110 may be sealed with any watertight connection commonly known in the art. For example, neoprene, nitrile, rubber, mastic, or similar types of materials or methods may be used. The inner chamber wall 112 may be constructed in a similar fashion with stacked cylindrical segments joining at overlapping segment joints 116. The stacking of the segments may allow for flexibility in the sizing of the separation tank 100 as a whole to satisfy varying field conditions and size requirements.

In the present embodiment of separation tank 100, the outer chamber 102 may have a volume in the range of about 350 to 1200 cubic feet with an overall diameter of about 8 to 12 feet and a height of about 12 to 21 feet. The dimensions of the inner chamber 104 may be smaller than that of the outer chamber 102 such that the inner chamber 104 may fit inside of the outer chamber 102. Preferably the inner chamber 104 may have a volume in the range of about 150 to 800 cubic feet with an overall diameter of about 4 to 7 feet and a height of about 10 to 21 feet. With the inner chamber 104 and outer chamber 102 having similar shapes in the present embodiment, as discussed above, the inner chamber 104 may be positioned inside of the outer chamber 102 such that the inner chamber wall 112 and the outer chamber wall 110 are substantially parallel. Thus, there may be a substantially constant distance and an area of open space defined by the outer surface of the inner chamber wall 112 and the inner surface of the outer chamber wall 110. This distance may be about 19 to 43 inches, although this distance may increase or decrease depending on the size of the separation tank 100, the flow rates anticipated, or the type of particulate matter anticipated to be trapped.

The inlet 106 may provide access through the outer chamber wall 110 to the outer chamber 102. The inlet 106 may be constructed with any piping materials commonly known in the art, e.g., concrete, aluminum, steel, PVC, HDPE, or other like materials. Preferably the inlet 106 may be a pipe or a similar structure with a diameter in the range of about 12 to 60 inches, although the particular sizing is not essential. Inside the outer chamber 102, a bottom section of the piping material used for the inlet 106 may extend horizontally across the outer chamber 102 to create an inlet channel 120. The inlet channel 120 may connect the inlet 106 to an inlet-channel-opening 122 at the inner chamber wall 112. Alternatively, the inlet channel 120 may be in the shape of a substantially flat plate. The inlet channel 120 may or may not have raised outer ribs 121 so as to define a flow path thereon. The inlet 106 may make a watertight connection 124 with the outer chamber wall 110 per methods commonly known in the art. Rubber boots, concrete grout, or similar types of materials or methods may be used.

The outlet 108 may provide an outlet passageway from the outer chamber 102 through the outer chamber wall 110. As described above, the outlet 108 may be constructed with any piping materials commonly known in the art, e.g., concrete, aluminum, steel, PVC, HDPE, or other like materials. Preferably the outlet 108 may be a pipe with a diameter in the range of about 12 to 60 inches, although the particular sizing is not essential. However, the outlet 108 generally may be the same size or larger than the inlet 106. The outlet 108 may make a watertight connection 126 with the outer chamber wall 110 as the outlet 108 exits the separation tank 100. As described above, rubber boots, concrete grout, or similar types of materials or methods may be used.

Both the inner chamber wall 112 and the outer chamber wall 110 may rest on a floor 128. The floor 128 may be a circular piece of rigid material, e.g., precast concrete, poured in place concrete, or similar types of materials. The selection of the materials may not be essential. The floor 128 may make watertight connections with both the outer chamber wall 110 and the inner chamber wall 112 per methods common in the art. As described above, rubber gaskets, neoprene gaskets, nitrile gaskets, or similar types of materials or methods may be used. The floor 128 may be sized such that its diameter is about the same as the diameter of the cylinder formed by the outer chamber wall 110.

Access may be provided between the outer chamber 102 and the inner chamber 104 by several means. The first, which is optional, is an overflow opening 130 to the outer chamber 102. As stated, the height range of the inner chamber 104 may be less than the outer chamber 102. Thus, there may exist a height differential between the two chambers, although in other embodiments the height of the inner 104 and outer 102 chamber may be the same. Preferably, no covering may be placed on top of the inner chamber 104 such that access between the outer chamber 102 and the inner chamber 104 may be achieved by the overflow opening 130.

The second means of access between the outer chamber 102 and the inner chamber 104 is the inlet-channel-opening 122. The inlet-channel-opening 122 may be a circular opening in the inner chamber wall 112 where the inlet channel 120 connects with the inner chamber 104. In the present embodiment 100, the inlet-channel-opening 122 may be the same diameter as the inlet 106, although this sizing may not be essential. Water may flow across the inlet channel 120 and into the inlet-channel-opening 122.

The third means of access between the outer chamber 102 and the inner chamber 104 may be an inner-chamber-wall-opening 132. In the present embodiment of the separation tank 100, the inner-chamber-wall-opening 132 may be a substantially rectangular opening in the inner chamber wall 112. The sizing or shape of the inner-chamber-wall-opening 132 is not essential, although the size may be sufficient such that the water flow therethrough will not be restricted and preferably large enough to slow the velocity of the water (thus promoting settling and preventing the resuspension of settled material and minimizing scour). Likewise, the inner-chamber-wall-opening 132 may not be too large as to compromise the structural integrity of the inner chamber wall 112. In the present embodiment of the separation tank 100, the height measurement of the inner-chamber-wall-opening 132 may be a about 36 to 72 inches and the width measurement of the inner-chamber-wall-opening 132 may be about 36 to 60 inches.

The orientation and positioning of the inner-chamber-wall-opening 132 may include that its bottom edge is adjacent to the floor 128. The inner-chamberwall-opening 132 may be at a level that is lower than the inlet 106, the inlet-channel-opening 122, and the outlet 108. The inner-chamber-wall-opening 132 may be separated from the inlet 106, the inlet-channel-opening 122, and the outlet 108 by at least a mid-section 134 of inner chamber wall 112. In the present embodiment of the separation tank 100, the height measurement of the mid-section 134 of inner chamber wall 112 may be about 36 to 60 inches, although this measurement may increase or decrease depending on the size and usage of the separation tank 100 as a whole. The inner-chamber-wall-opening 132 may be oriented such that it is generally beneath the inlet-channel-opening 122. Water may spill off of the inlet channel 120 and drop into the outer chamber 102 or water may flow out of the inner chamber 104 into the outer chamber 102 through the inner-chamber-wall-opening 132.

As stated above, the inlet 106, the inlet-channel-opening 122, and the outlet 108 may be positioned such that they may be at a level which is higher than the inner-chamber-wall-opening 132 and may be separated from the inner-chamber-wall-opening 132 by the mid-section 116 of inner chamber wall 112. In relation to each other, the inlet 106 and the inlet-channel-opening 122 may be substantially at the same height in the separation tank 100 and may be aligned in a substantially linear manner. The inlet 106 and outlet 108 also may be positioned at the same or a similar height from the floor 128 of about 8 to 11 feet, although this measurement may increase or decrease depending on the size and usage of the separation tank 100 as a whole. Preferably, the inlet 106 may be 1–3 inches higher than the outlet 108. Furthermore, the inlet 106 and outlet 108 may not necessarily be positioned at the same or similar height as long as the lower of the two is above the inner-chamber-wall-opening 132 and separated from the inner-chamber-wall-opening 132 by the mid-section 116 of the inner chamber wall 112. As is shown, the inlet 106 and the outlet 108 may be oriented such that they are aligned in a substantially linear fashion. This orientation is exemplary only, as will be explained in more detail below.

The present embodiment of the separation tank 100 may further include a number of optional baffles. Two lower baffles 136 may be substantially thin, solid elements that may connect the outer chamber wall 110 to the inner chamber wall 112. The lower baffles 136 may extend from floor 128 to above the height of the inner-chamber-wall-opening 132 but below the height of the inlet channel 120. The lower baffles 136 may have a height of about 5 to 6 feet and a thickness of about 2 to 12 inches. Two upper baffles 138 also may be similar thin, solid elements that connect the outer chamber wall 110 to the inner chamber wall 112. The upper baffles 138 may not connect with the floor 128 of the separation tank 100 thereby leaving a space 140 between the floor 128 and the bottom edge of the upper baffle 138. This space 140 generally may have a height of about 30 to 48 inches. Of course, the height of the space 140 may increase or decrease depending on the size and usage of the separation tank 100 as a whole. The upper baffle 138 may continue to a height that is greater than the outlet 108 but less than the top of the inner chamber wall 112. The upper baffles 138 may have a height of about 8 to 10 feet and a thickness of about 2 to 12 inches.

The top of the outer chamber walls 110 may be left open or bound by a cover 142. The cover 142 may include a circular piece of a rigid material, i.e., precast concrete, stainless steel, aluminum, or other similar material. The selection of the material is not essential. The diameter of the cover 142 may be the same as the outer chamber 102 such that a substantially tight seal may be formed between the cover 142 and the outer chamber wall 110. The cover 142 may include a single or multiple access openings 144, 146 so as to provide access to the outer chamber 102 and the inner chamber 104 as described in more detail below.

FIG. 2 shows the present embodiment of the separation tank 100 in plan view. As can be seen, the inner chamber 104 may be oriented such that it is centered inside the outer chamber 102. The distance separating the inner chamber wall 112 and the outer chamber wall 110 may be substantially constant. This orientation, however, may not be essential as the inner chamber 104 may be oriented in an off-center position within the outer chamber 102 and still function as intended.

The positioning of the lower baffles 136 and upper 138 baffles between the outer 110 and inner 112 chamber walls can be seen. The lower baffles 136 may flank the inner-chamber-wall-opening 132 in present embodiment of the separation tank 100. Although the positioning may vary, the lower baffles 136 generally may be located adjacent to the inner-chamber-wall-opening 132 with one lower baffle 136 to each side so as to form a first basin 137. Similarly, the upper baffles 138 may flank the outlet 108 so as to form a second basin 139. Although the positioning may vary, the upper baffles 138 generally may be located adjacent to the outlet 108 with one baffle to each side of the outlet 108.

The inlet 106, the inlet channel 120, the inlet-channel-opening 122, and the outlet 108 may be aligned in a substantially linear manner. However, the linear alignment of the inlet 106 and the outlet 108 is exemplary only. Variation of this alignment is possible and the separation tank 100 still function as intended. This flexibility may allow the separation tank 100 to perform as a junction point for a storm water drainage line that does not run in a straight linear fashion.

The multiple access opening 144, 146 may be seen in plan view. Although the number and placement of the access openings 144, 146 may vary, a center access opening 144 may be provided to allow more direct access to the inner chamber 104. Two secondary access openings 146 may be provided along the periphery of the cover 142 to provide more direct access to the outer chamber 102.

In use, as shown in FIG. 3, storm water or other fluid may enter through the inlet 106. The water may then be directed by the inlet channel 120 into the inlet-channel-opening 122 where it may enter the inner chamber 104. The velocity of the water may be slowed in the inner chamber 104 as the water encounters the opposing inner chamber wall 112. The water may then flow down the inner chamber 104 to the inner-chamber-wall-opening 132 where it may enter the outer chamber 102 and the first basin 137. The water then may flow over the lower baffles 136. Upon cresting the lower baffles 136, the water may flow through the open space 140 defined by the bottom edge of the upper baffle 138 and the floor 128 into the second basin 139. Water may then flow upwards to the outlet 108 where it may exit the separation tank 100. In times of heavy flow, a portion of the incoming water may enter the outer chamber 102 directly by falling over the side of the inlet channel 120. This water may then proceed to the open space 140 defined by the bottom edge of the upper baffle 138 and the floor 128 as described above into the second basin 139.

The separation tank 100 may trap particulate matter from the storm water (or other liquids depending on use) in the following manner. The velocity of the water may be slowed in the separation tank 100 as the water is redirected and enters the inner chamber 104 and then the outer chamber 102. Specifically, the water may be redirected upon entering the inner chamber 104. As discussed above, the water may flow through the inner-chamber-wall-opening 132, into the first basin 137, and then upwards past the lower baffles 136. Any non-floating particulate matter 302 may settle to the floor 128 and may either remain in the inner chamber 104 or within the first basin 137. In some instances during heavy flow, non-floating particulate matter 302 may fall over the side of the inlet channel 120 and will likely fall into the outer chamber 102 within the first basin 137 and should be trapped. In the case where the non-floating particulate matter 302 does not fall between the lower baffles 136, the matter 302 may remain trapped on the floor 128 because the flow may be unable to push the non-floating particulate matter up to the outlet 108.

Any floating particulate matter 304 in the storm water also may be trapped within the separation tank 100. Upon entering the separation tank 100, floating particulate matter 304 may be directed into the inner chamber 104 or during high flow the outer chamber 102, as discussed above, and remain in the outer chamber 102. In the inner chamber 104, the floating particulate matter 304 may remain near the surface of the water and may be unable to exit the inner chamber 104 because the inner-chamber-wall-opening 132 may be positioned at the bottom of the separation tank 100. Any floating particulate matter 304 in the outer chamber 102 may be blocked from the outlet 108 by the upper baffle 138. As described, the upper baffle 138 may extend beneath the level of the outlet 108 to a position near the floor 128. Generally, the water level of the separation tank 100 between flow events may be maintained at a low water level 306. Thus, floating particulate matter 302 may generally reside at a level above the bottom edge of the upper baffle 138 and may not gain access to the outlet 108.

Any obstruction in the inner chamber 104, the inner-chamber-wall-opening 132, or in the open space 140 should not prohibit water flow through the separation tank 100. As stated, water may flow directly into the outer chamber 102 and flow over the upper baffle 138 to reach the outlet 108. Maintenance of the separation tank 100 to clear any obstruction or accumulated particulate matter may be completed through the access openings 144, 146. As stated, a center access opening 144 may be provided to allow more direct access to the inner chamber 104. Two other access openings 146 may be provided along the periphery of the cover 142 to provide more direct access to the outer chamber 102.

Figure 4:
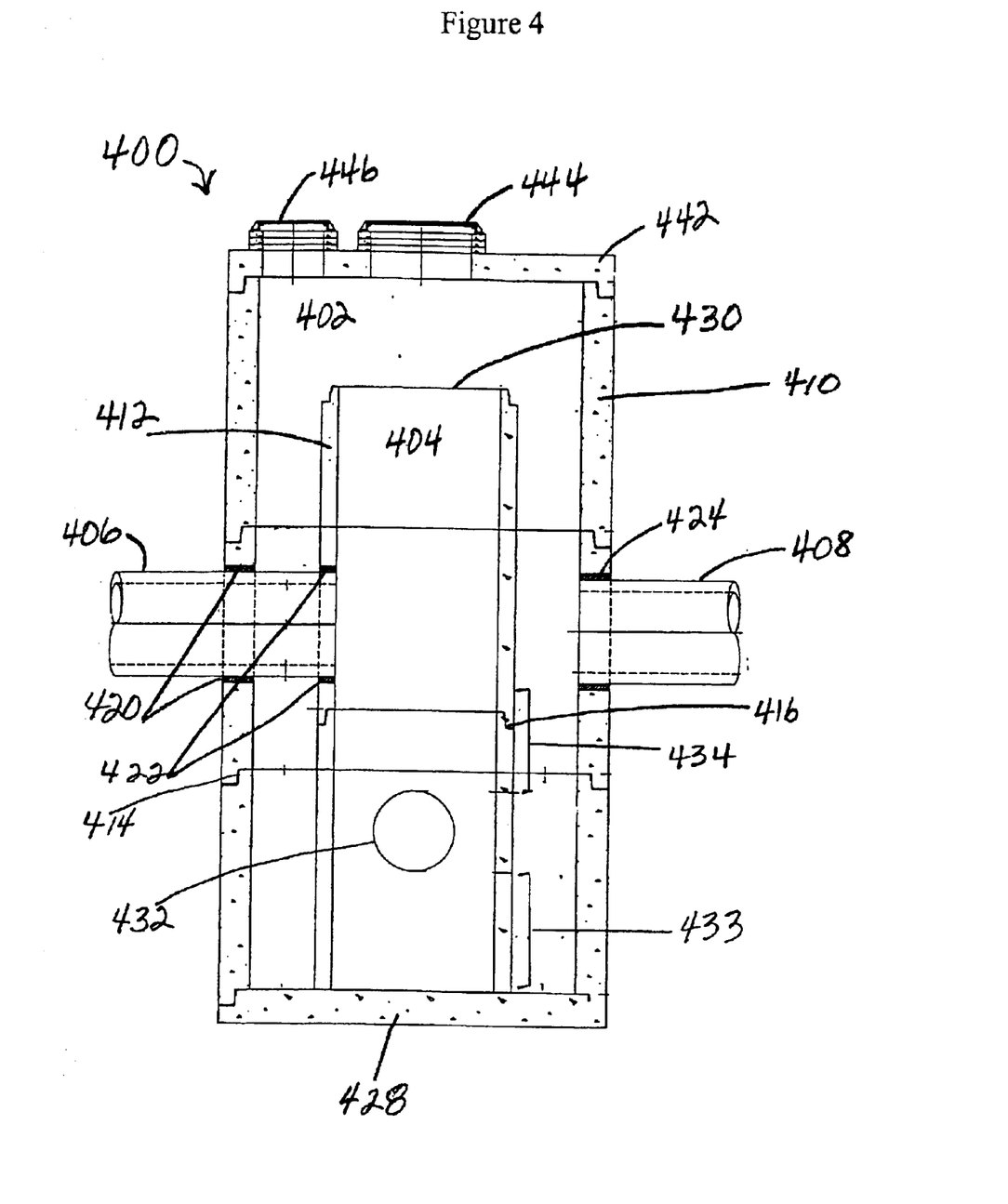
FIG. 4 is a side cross-sectional view of an alternative embodiment of the separation tank of the present invention.

Another embodiment of the present invention, a separation tank 400, is shown in FIG. 4. The separation tank 400 may include an outer chamber 402, and inner chamber 404, an inlet 406, an outlet 408, and other features to be described.

The outer chamber 402 may be defined by an outer chamber wall 410. The outer chamber wall 410 may have a substantially cylindrical shape, as is shown. The inner chamber 404 may be defined by an inner chamber wall 412. Preferably the inner chamber wall 412 may form substantially the same shape as the outer chamber wall 410, though this may not be necessary. As shown, the inner chamber wall 412 also may form a cylindrical shape. The outer chamber wall 410 may be constructed with stacked cylindrical segments that may be joined at overlapping segment joints 414. The segment joints 414 of the outer chamber wall 410 may be sealed with any watertight connection commonly known in the art. For example, rubber, neoprene or nitrile may be used. The inner chamber wall 412 may be constructed in a similar fashion with stacked cylindrical segments joining at overlapping segment joints 416. The stacking of the segments may allow for flexibility in the sizing of the separation tank 400 as a whole to satisfy varying field conditions and size requirements.

In the present embodiment of separation tank 400, the outer chamber 402 may have a volume in the range of about 350 to 1200 cubic feet with an overall diameter of about 8 to 12 feet and a height of about 12 to 21 feet. The dimensions of the inner chamber 404 may be smaller than that of the outer chamber 402 such that the inner chamber 404 may fit inside of the outer chamber 402. Preferably the inner chamber 404 may have a volume in the range of about 150 to 800 cubic feet with an overall diameter of about 4 to 7 feet and a height of about 10 to 21 feet. With the inner chamber 404 and outer chamber 402 having similar shapes in the present embodiment, as discussed above, the inner chamber 404 may be positioned inside of the outer chamber 402 such that the inner chamber wall 412 and the outer chamber wall 410 may be substantially parallel. Thus, there may be a substantially constant distance and an area of open space defined by the outer surface of the inner chamber wall 412 and the inner surface of the outer chamber wall 410. This distance may be about 19 to 43 inches, though this distance may increase or decrease depending on the size of the separation tank 400, the flow rates anticipated, or the type of particulate matter anticipated to be trapped.

The inlet 406 may provide access through the outer chamber wall 410, the outer chamber 402, and the inner chamber wall 412 to the inner chamber 404. The inlet 406 may be constructed with any piping materials commonly known in the art, e.g., concrete, aluminum, steel, PVC, HDPE, or other like materials. Preferably the inlet 406 may be a pipe or similar structure with a diameter in the range of about 12 to 60 inches, although the particular sizing is not essential. The inlet 406 may make a watertight connection 420 with the outer chamber wall 410 per methods commonly known in the art and may make a watertight connection 422 with the inner chamber wall 412. Rubber boots, concrete grout, or similar types of materials or methods may be used.

The outlet 408 may provide an outlet passageway from the outer chamber 402 through the outer chamber wall 410. As described above, the outlet 408 may be constructed with any piping materials commonly known in the art, e.g., concrete, aluminum, steel, PVC, HDPE, or other like materials. Preferably the outlet 408 may be a pipe with a diameter in the range of about 12 to 60 inches, although the particular sizing is not essential. However, the outlet 408 generally may be the same size or larger than the inlet 406. The outlet 408 may make a watertight connection 424 with the outer chamber wall 410 as the outlet 408 exits the separation tank 400. As described above, rubber boots, concrete grout, or similar types of materials or methods may be used.

Both the inner chamber wall 412 and the outer chamber wall 410 may rest on a floor 428. The floor 428 may be a circular piece of a rigid material, i.e., precast concrete, poured in place concrete, or similar types of materials. The selection of the materials may not be essential. The floor 428 may make watertight connections with both the outer chamber wall 410 and the inner chamber wall 412 per methods common in the art. As described above, rubber gaskets, neoprene gaskets, nitrile gaskets, or similar types of materials or methods may be used. The floor 428 may be sized such that its diameter is about the same as the diameter of the cylinder formed by the outer chamber wall 410.

Access may be provided from the inner chamber 404 to the outer chamber 402 by several means. The first, which is optional, is an overflow opening 430 to the outer chamber 402. As stated, the height range of the inner chamber 404 may be less than that for the outer chamber 402. Thus, there may exist a height differential between the two chambers, although in other embodiments the height of the inner 404 and outer 402 chamber may be the same. Preferably, no covering may be placed on top of the inner chamber 404 such that access between the outer chamber 402 and the inner chamber 404 may be achieved by the overflow opening 430. The water in the inner chamber 404 may thus flow over the inner chamber wall 412 into the outer chamber 402.

The second means of access from the inner chamber 404 to the outer chamber 402 may be through an inner-chamber-wall-opening 432. In present embodiment of the separation tank 400, the inner-chamber-wall-opening 432 may include two substantially circular openings in the inner chamber wall 412. The number, shape, or sizing of the inner-chamber-wall-opening 432 are not essential. Preferably the size of the inner-chamber-wall-opening 432 may be sufficient such that the water flow therethrough will not be restricted and large enough to slow the velocity of the water (thus promoting settling and preventing the resuspension of settled material and minimizing scour). Likewise, the inner-chamber-wall-opening 432 may not be so large as to compromise the structural integrity of the inner chamber wall 412. In general, the combined area of the inner-chamber-wall-openings 432 may be at least the same size as the inlet 406 pipe. In present embodiment of the separation tank 400, the diameter of each inner-chamber-wall-opening 432 may be about 24 to 42 inches. Water may flow out of the inner chamber 404 into the outer chamber 402 through the inner-chamber-wall-opening 432.

The inner-chamber-wall-opening 432 may be separated from the floor 428 by a lower-section 433 of inner chamber wall 412. In present embodiment of the separation tank 400, the height measurement of the lower-section 433 may be about 36 to 48 inches, although this measurement may increase or decrease depending on the size and usage of the separation tank 400 as a whole. In other embodiments, the inner-chamber-wall-opening 432 may be adjacent to the floor 428. Each inner-chamber-wall-opening 432 also may be positioned below the height of the inlet 406 and the outlet 408 and may be separated from each by at least a mid-section 434 of inner chamber wall 412. In present embodiment of the separation tank 400, the height measurement of the mid-section 434 may be about 36 to 48 inches, although this measurement may also increase or decrease depending on the size and usage of the separation tank 400.

The inner-chamber-wall-openings 432 may oppose each other across the inner chamber 404 on opposite faces of the inner chamber wall 412. Furthermore, in present embodiment of the separation tank 400, the inner-chamber-wall-openings 432 may be oriented such that the direction of the opposing openings is perpendicular to the inlet 406. This positioning however may be modified and the separation tank 400 may still function as intended. The inner-chamber-wall-openings 432 may be positioned along any face of the inner chamber wall 412 within the vertical area specified above, and it is not essential that the openings 432 oppose each other. Furthermore, it may not be essential that there be exactly two inner-chamber-wall-openings 432. There may be a single opening or multiple openings and the separation tank 400 may still function as intended.

As stated, the inlet 406 and the outlet 408 are positioned such that they may be at a level which is higher than the inner-chamber-wall-opening 432 and may be separated from the opening 432 by the mid-section 434 of inner chamber wall 412. The inlet 406 and the outlet 408 also may be positioned at the same or a similar height from the floor 428 of about 8 to 11 feet, although this measurement may increase or decrease depending on the size and usage of the separation tank 400 as a whole. Preferably, the inlet 406 may be 1–3 inches higher than the outlet 408. Furthermore, the inlet 406 and the outlet 408 may not necessarily be positioned at the same or a similar height as long as the lower of the two is above the inner-chamber-wall-opening 432 and separated from the inner-chamber-wall-opening 432 by the mid-section 434 of the inner chamber wall 412. As is shown, the inlet 406 and the outlet 408 may be oriented such that they are aligned in a substantially linear fashion. This orientation is exemplary only, as will be explained in more detail below.

The top of the outer chamber walls 410 may be left open or bound by a cover 442. The cover 442 may include a circular piece of a rigid material, e.g., precast concrete, aluminum, stainless steel, or other similar material. The selection of the material is not essential. The diameter of the cover 442 may be the same as the outer chamber 402 such that a substantially tight seal may be formed between the cover 442 and the outer chamber wall 410. The cover 442 may include a single or multiple access openings 444, 446 so as to provide access to the outer chamber 402 and the inner chamber 404 as described in more detail below.

Figure 5:
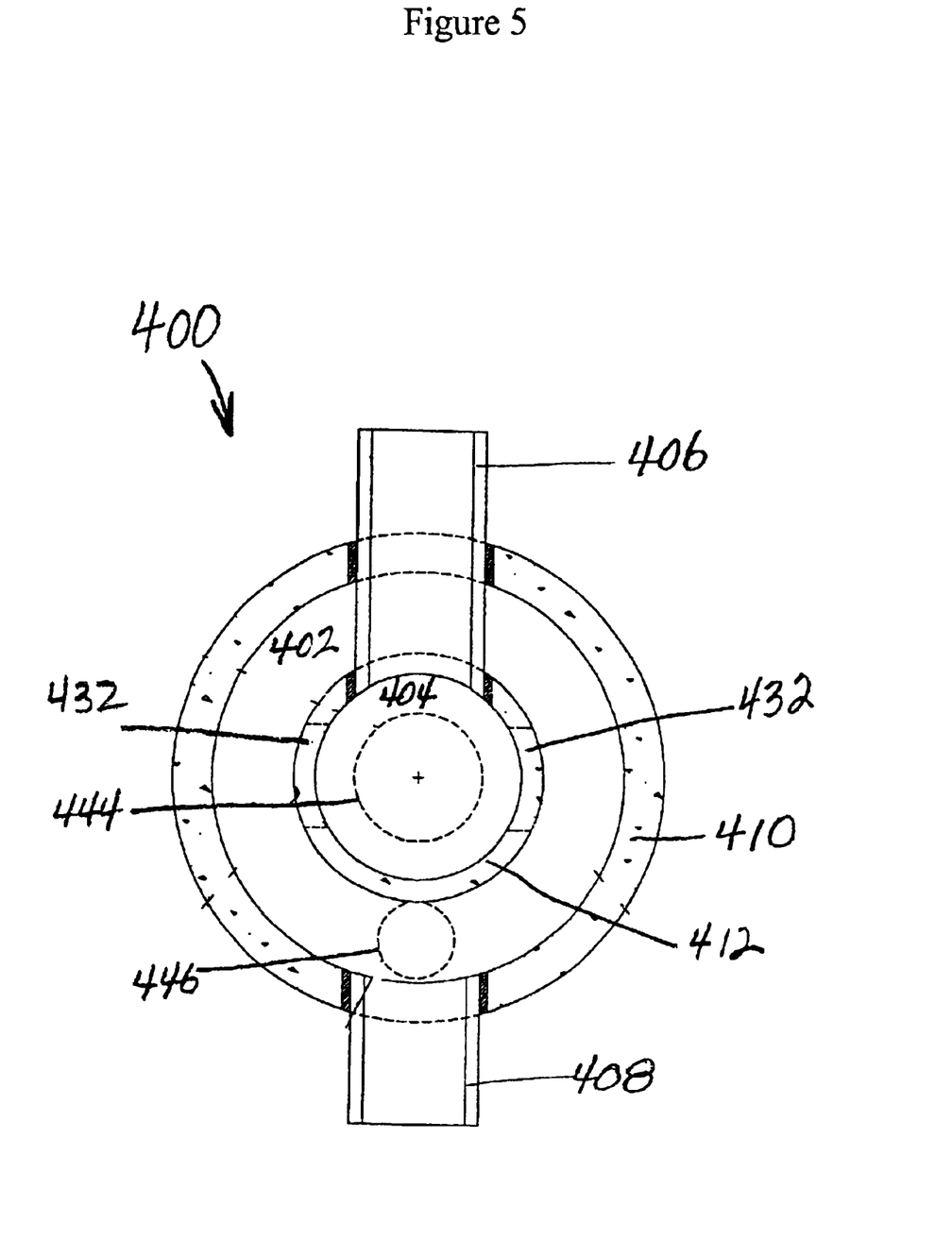
FIG. 5 is a top plan view of the separation tank of FIG. 4.

FIG. 5 shows the present embodiment of the separation tank 400 in plan view. As can be seen, the inner chamber 404 may be oriented such that it is centered inside the outer chamber 402. The distance separating the inner chamber wall 412 and the outer chamber wall 410 may be substantially constant. This orientation, however, may not be essential as the inner chamber 404 may be oriented in an off-center position within the outer chamber 402 and still function as intended.

As can be seen more easily in plan view, the inlet 406 and the outlet 408 pipes are aligned in linear fashion. However, the linear alignment of the inlet 406 and the outlet 408 is exemplary only. Variation of this alignment is possible and the separation tank 400 may still function as intended. This flexibility may allow the separation tank 400 to perform as a junction point for a storm water drainage line that does not run in a straight linear fashion. In addition, both of the inner-chamber-wall-openings 432 are shown on opposing sides of the inner chamber 404 and perpendicularly aligned to the linear orientation of the inlet 406 and the outlet 408 pipes, As stated above, however, this positioning may be altered and the separation tank 400 may still function as intended.

Multiple access opening 444, 446 may be seen in plan view. Although the number and placement of the access openings 444, 446 may vary, a center access opening 444 may be provided to allow more direct access to the inner chamber 404. A single or multiple secondary access openings 446 may be provided along the periphery of the cover 442 to provide more direct access to the outer chamber 402.

Figure 6:
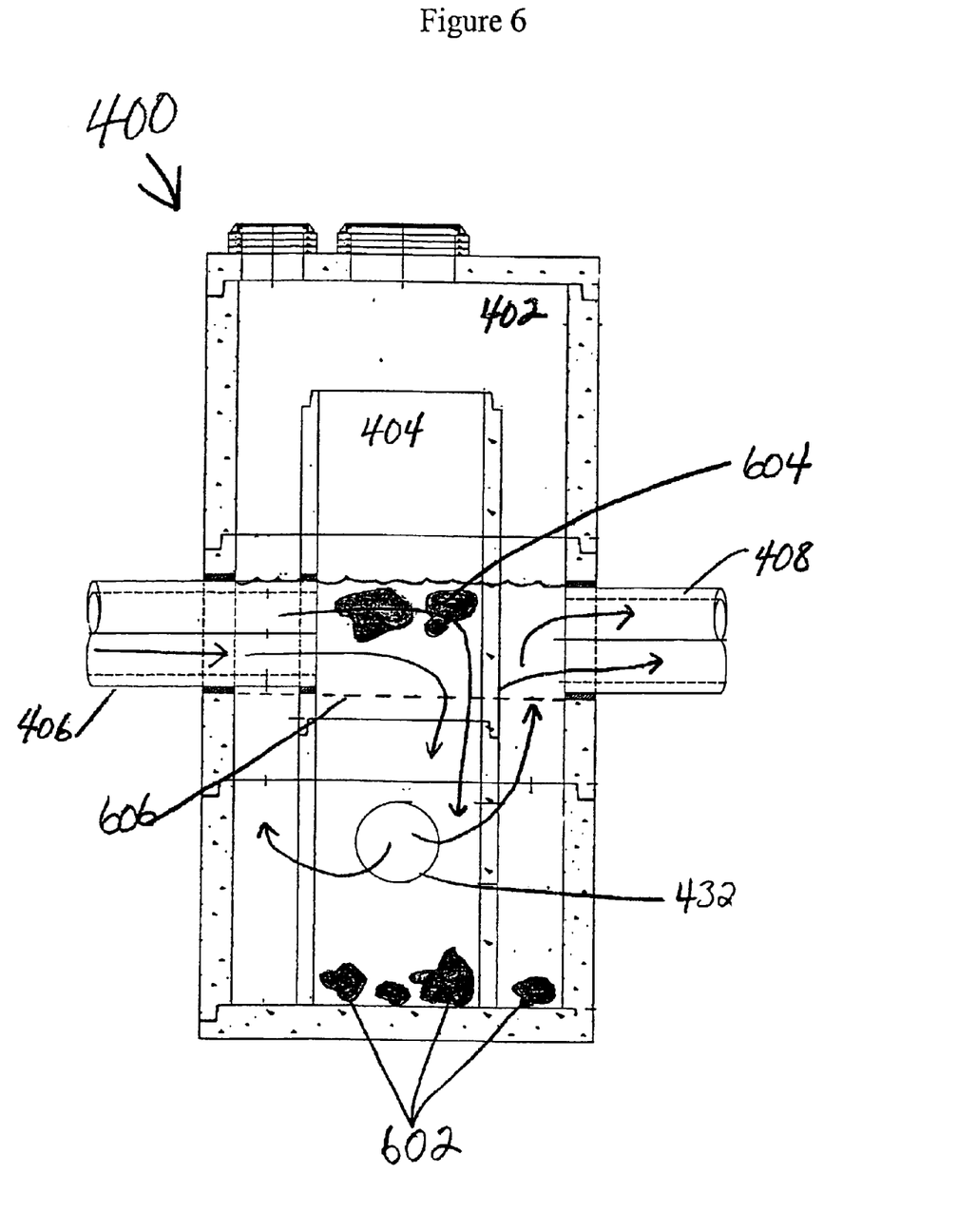
FIG. 6 is side cross-sectional view of the separation tank of FIG. 4 showing the device in use.

In use, as shown in FIG. 6, storm water or other fluid may enter through the inlet 406 into the inner chamber 404. The portion of the inner chamber wall 412 opposite of the inlet 406 in the inner chamber 404 may act to redirect and slow the velocity of the water. The water may flow down into the inner chamber 404. The water may flow through the inner-chamber-wall-openings 432 into the outer chamber 402. The water then may flow upwards in the outer chamber 402 where it may exit the separation tank 400 through the outlet 408.

The separation tank 400 may trap particulate matter from the storm water (or other liquids depending on use) in the following manner. As the velocity of the water may be slowed upon entering the inner chamber 404, as discussed above, non-floating particulate matter 602 may sink to the floor 428 of the separation tank 400 in the inner chamber 404. As discussed above, the inner-chamber-wall-openings 432 may be located above the floor 428. Thus, the lower section 433 of the inner chamber wall 412 may prevent the non-floating particulate matter 602 from flowing into the outer chamber 402 and leaving the separation tank 400 through the outlet 408. Non-floating particulate matter 602 of any size may be filtered in this matter. Non-floating particulate matter 602 may, from time to time, enter the outer chamber 402 through the inner-chamber-wall-openings 432 as it sinks to the floor 428. Because of the slowed velocity of the water and the raised position of the outlet 408, this non-floating particulate matter 602 may generally sink to the floor 428 of the outer chamber 402 and also may be trapped.

Floating particulate matter 604 may be trapped in the separation tank 400 in the following manner. Generally, the water level may be maintained between flow events at a low water level 606. As water enters the separation tank 400 at the inlet 406, floating particulate matter 604 may remain at or near the surface of the water in the inner chamber 404. As described above, the inner-chamber-wall-openings 432 may be located beneath the low water level 606 and beneath the outlet 408, and may be separated from each by the mid-section 434 of the inner chamber wall 412. Thus, the mid-section 434 of inner chamber wall 412 may prevent floating particulate matter 604 from entering the outer chamber 402 through the inner-chamber-wall-openings 432 and leaving the separation tank 400 through the outlet 408. Floating particulate matter 604 instead may remain in the inner chamber 404.

If obstruction prevents flow from the inner chamber 404 to the outer chamber 402 through the inner-chamber-wall-opening 432, the water may rise in the inner chamber 404 until it flows out of the overflow opening 430 and to the outer chamber 402. Once in the outer chamber 402 the water then may be able to leave the separation tank 400 through the outlet 408, thus, bypassing the obstruction. Maintenance of the separation tank 400 to clear any obstruction or accumulated particulate matter may be completed through the access openings 444, 446. As stated, a center access opening 444 may be provided to allow more direct access to the inner chamber 404. One or more other secondary access openings 446 may be provided along the periphery of the cover 442 to provide more direct access to the outer chamber 402.

Figure 7:
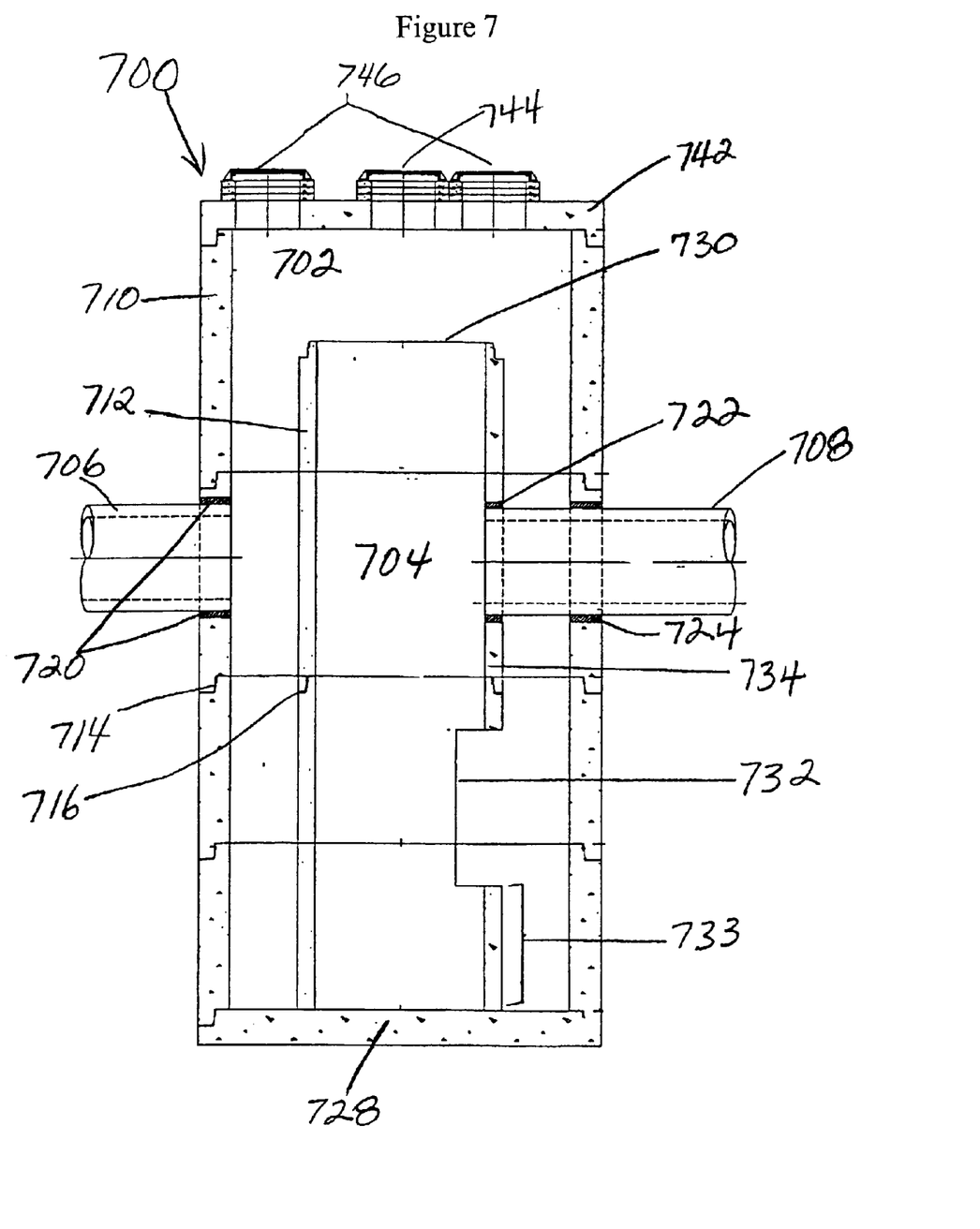
FIG. 7 is a side cross-sectional view of an alternative embodiment of the separation tank of the present invention.

Another embodiment of the present invention, a separation tank 700, is shown in FIG. 7. The separation tank 700 may include an outer chamber 702, and inner chamber 704, an inlet 706, an outlet 708, and other features to be described.

The outer chamber 702 may be defined by an outer chamber wall 710. The outer chamber wall 710 may have a substantially cylindrical shape, as is shown. The inner chamber 704 may be defined by an inner chamber wall 712. Preferably the inner chamber wall 712 may form substantially the same shape as the outer chamber wall 710, although this may not be necessary. As shown, the inner chamber wall 712 also may form a cylindrical shape. The outer chamber wall 710 may be constructed with stacked cylindrical segments that may be joined at overlapping segment joints 714. The segment joints 714 of the outer chamber wall 710 may be sealed with any watertight connection commonly known in the art. For example, rubber gaskets or neoprene or nitrile gaskets may be used. The inner chamber wall 712 may be constructed in a similar fashion with stacked cylindrical segments joining at overlapping segment joints 716. The stacking of the segments may allow for flexibility in the sizing of the separation tank 700 as a whole to satisfy varying field conditions and size requirements.

In the present embodiment of separation tank 700, the outer chamber 702 may have a volume in the range of about 350 to about 1200 cubic feet with an overall diameter of about 8 to 12 feet and a height of about 12 to 21 feet. The dimensions of the inner chamber 704 may be smaller than that of the outer chamber 702 such that the inner chamber 704 may fit inside of the outer chamber 702. Preferably the inner chamber 704 may have a volume in the range of about 150 to 800 cubic feet with an overall diameter of about 4 to 7 feet and a height of about 10 to 21 feet. With the inner chamber 704 and outer chamber 702 having similar shapes in the present embodiment, as discussed above, the inner chamber 704 may be positioned inside of the outer chamber 702 such that the inner chamber wall 712 and the outer chamber wall 710 may be substantially parallel. Thus, there may be a substantially constant distance and an area of open space defined by the outer surface of the inner chamber wall 712 and the inner surface of the outer chamber wall 710. This distance may be about 19 to 43 inches, though this distance may increase or decrease depending on the size of the separation tank 700, the flow rates anticipated, or the type of particulate matter anticipated to be trapped.

The inlet 706 may provide access through the outer chamber wall 710 to the outer chamber 702. The inlet 706 may be constructed with any piping materials commonly known in the art, e.g., concrete, aluminum, steel, PVC, HDPE, or other like materials. Preferably the inlet 706 may be a pipe or a similar structure with a diameter in the range of about 12 to 60 inches, although the particular sizing is not essential. The inlet 706 may make a watertight connection 720 with the outer chamber wall 710 per methods commonly known in the art. Rubber boots, concrete grout, or similar types of materials or methods may be used.

The outlet 708 may provide an outlet passageway from the inner chamber 704 through the inner chamber wall 712, the outer chamber 702, and the outer chamber wall 710. As described above, the outlet 708 may constructed with any piping materials commonly known in the art, e.g., concrete, aluminum, steel, PVC, HDPE, fiberglass, or other like materials. Preferably the outlet 708 may be a pipe with a diameter in the range of about 12 to 60 inches, although the particular sizing is not essential. However, the outlet 708 generally may be the same size or larger than the inlet 706. The outlet 708 may make a watertight connection 722 with the inner chamber wall 712 and a watertight connection 724 with the outer chamber wall 710 as the outlet 708 exits the separation tank 700. As described above, rubber boots, concrete grout, or similar types of materials or methods may be used.

Both the inner chamber wall 712 and the outer chamber wall 710 may rest on a floor 728. The floor 728 may be a circular piece of a rigid material, i.e., precast concrete, poured in place concrete, or similar types of materials. The selection of the materials may not be essential. The floor 728 may make watertight connections with both the outer chamber wall 710 and the inner chamber wall 712 per methods common in the art. As described above, rubber gaskets, neoprene gaskets, nitrile gaskets, or similar types of materials or methods may be used. The floor 728 may be sized such that its diameter is about the same as the diameter of the cylinder formed by the outer chamber wall 710.

Access may be provided from the outer chamber 702 to the inner chamber 704 by several means. The first, which is optional, is the overflow opening 730 to the inner chamber 704. As stated, the height range of the inner chamber 704 may be less than that for the outer chamber 702. Thus, there may exist a height differential between the two chambers, although in other embodiments the height of the inner 704 and the outer 702 chambers may be the same. Preferably, no covering may be placed on top of the inner chamber 704 such that access between the outer chamber 702 and the inner chamber 704 may be achieved by the overflow opening 730. The water thus may flow over the inner chamber wall 712 into the inner chamber 704.

The second means of access from the outer chamber 702 to the inner chamber 704 may be through an inner-chamber-wall-opening 732. In the present embodiment of the separation tank 700, the inner-chamber-wall-opening 732 may be a substantially rectangular opening in the inner chamber wall 712. The number, shape, and sizing of the inner-chamber-wall-opening 732 may not be essential. Preferably the size of the inner-chamber-wall-opening 732 may be sufficient such that the water flow therethrough will not be restricted and large enough to slow the velocity of the water (thus promoting settling and preventing the resuspension of settled material and minimizing scour). Likewise, the inner-chamber-wall-opening 732 may not be too large as to compromise the structural integrity of the inner chamber wall 712. In general, the inner-chamber-wall-opening 732 may be the same size or slightly larger than the inlet 706. In the present embodiment of the separation tank 700, the height measurement of the inner-chamber-wall-opening 732 may be a about 24 to 42 inches, and the width measurement of the inner-chamber-wall-opening 732 may be about 36 to 60 inches. Water may flow into the inner chamber 704 from the outer chamber 702 through the inner-chamber-wall-opening 732.

The inner-chamber-wall-opening 732 may be positioned such that it is separated from the floor 728 by a lower-section 733 of the inner chamber wall 712. In the present embodiment of the separation tank 700, the height measurement of the lower-section 733 may be about 36 to 48 inches, although this measurement may increase or decrease depending on the size and usage of the separation tank 700 as a whole. In other embodiments, the inner-chamber-wall-opening 732 may be adjacent to the floor 728. The inner-chamber-wall-opening 732 also may be positioned below the height of the inlet 706 and outlet 708 and may be separated from each by at least a mid-section 734 of inner chamber wall 712. In present embodiment of the separation tank 700, the height measurement of the mid-section 734 may be about 36 to 42 inches, although this measurement also may increase or decrease depending on the size and usage of the separation tank 700. The inner-chamber-wall-opening 732 may be oriented such that it is generally on the opposite side of the inner chamber 704 as the inlet 706, although this may be altered and the separation tank 700 may still function as intended. Additionally, there may be a single opening or multiple inner-chamber-wall-openings 732 and the separation tank 700 may still function as intended.

As stated, the inlet 706 and the outlet 708 may be positioned such that they may be at a level which is higher than inner-chamber-wall-opening 732 and separated from the inner-chamber-wall-opening 732 by the mid-section 734 of inner chamber wall 712. The inlet 706 and outlet 708 also may be positioned at the same or a similar height from the floor 728 of about 8 to 11 feet, although this measurement may increase or decrease depending on the size and usage of the separation tank 700 as a whole. Preferably, the inlet 706 may be 1–3 inches higher than the outlet 708. Furthermore, the inlet 706 and outlet 708 may not necessarily be positioned at the same or a similar height as long as the lower of the two is above the inner-chamberwall-opening 732 and separated from the inner-chamber-wall-opening 732 by the mid-section 734 of the inner chamber wall 712. As is shown, the inlet 706 and the outlet 708 may be oriented such that they are aligned in a substantially linear fashion. This orientation is exemplary only, as will be explained in more detail below.

The top of the outer chamber walls 710 may be left open or bound by a cover 742. The cover 742 may include a circular piece of a rigid material, i.e., precast concrete, aluminum, stainless steel, or other similar material. The selection of material is not essential. The diameter of the cover 742 may be the same as the outer chamber 702 such that a substantially tight seal may be formed between the cover 742 and the outer chamber wall 710. The cover 742 may include a single or multiple access openings 744, 746 so as to provide access to the outer chamber 702 and the inner chamber 704 as described in more detail below.

Figure 8:
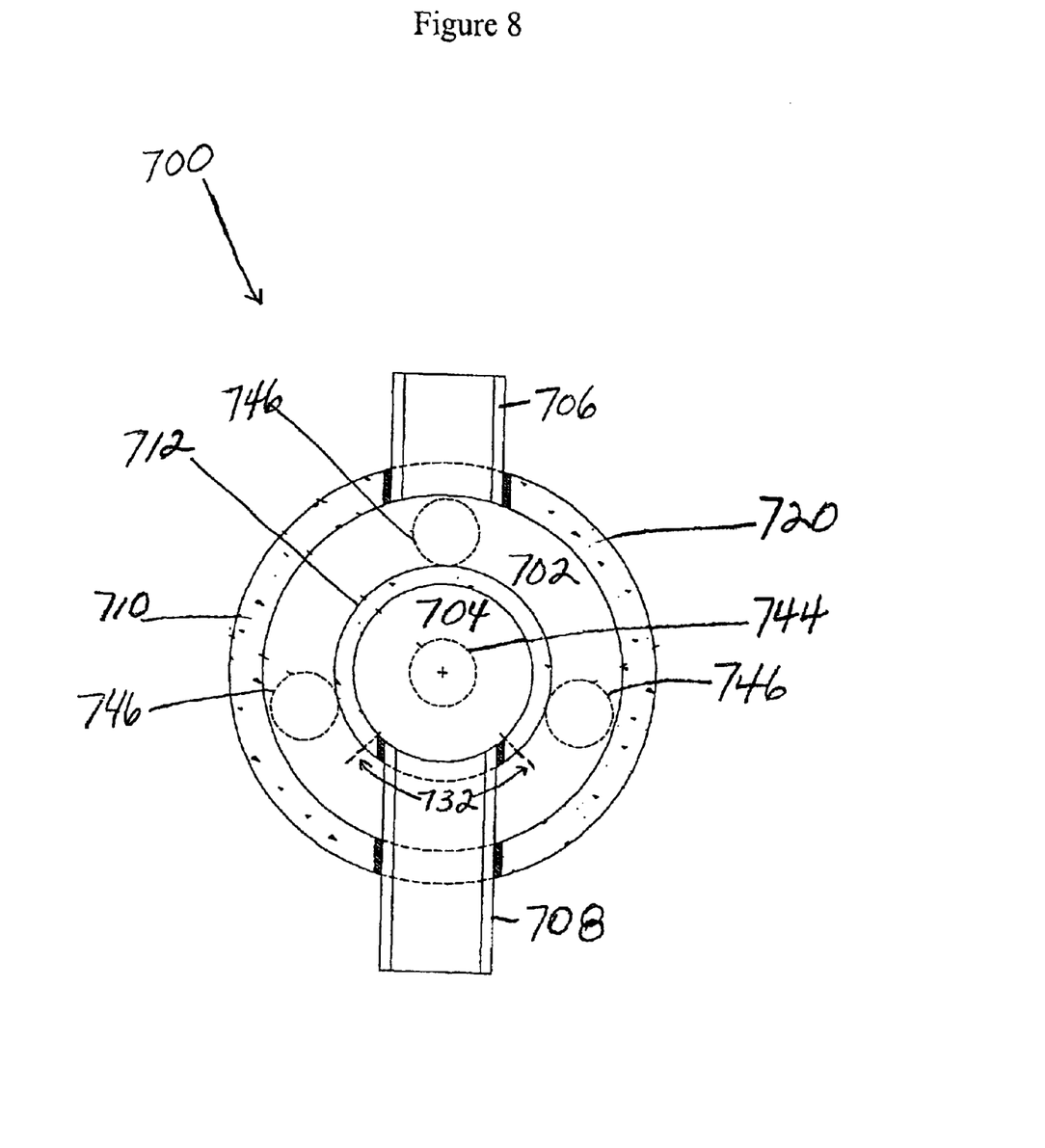
FIG. 8 is a top plan view of the separation tank of FIG. 7.

FIG. 8 shows the present embodiment of the separation tank 700 in plan view. As can be seen, the inner chamber 704 may be oriented such that it is centered inside the outer chamber 702. The distance separating the inner chamber wall 712 and the outer chamber wall 710 may be substantially constant. This orientation, however, may not be essential as the inner chamber 704 may be oriented in an off-center position within the outer chamber 702 and may still function as intended.

As can be seen more easily in plan view, the inlet 706 and the outlet 708 pipes may be aligned in linear fashion. However, the linear alignment of the inlet 706 and the outlet 708 is exemplary only. Variation of this alignment is possible and the separation tank 700 still may function as intended. This flexibility may allow the separation tank 700 to perform as a junction point for a storm water drainage line that does not run in a straight linear fashion. In addition, the inner-chamber-wall-opening 732 can been seen beneath the outlet 708. As stated above, this is may be altered and the separation tank 700 may still function as intended.

Multiple access opening 744, 746 may be seen in plan view. Although the number and placement of the access openings 744, 746 may vary, a center access opening 744 may be provided to allow more direct access to the inner chamber 704. A single or multiple secondary access openings 746 may be provided along the periphery of the cover 742 to provide more direct access to the outer chamber 702.

Figure 9:
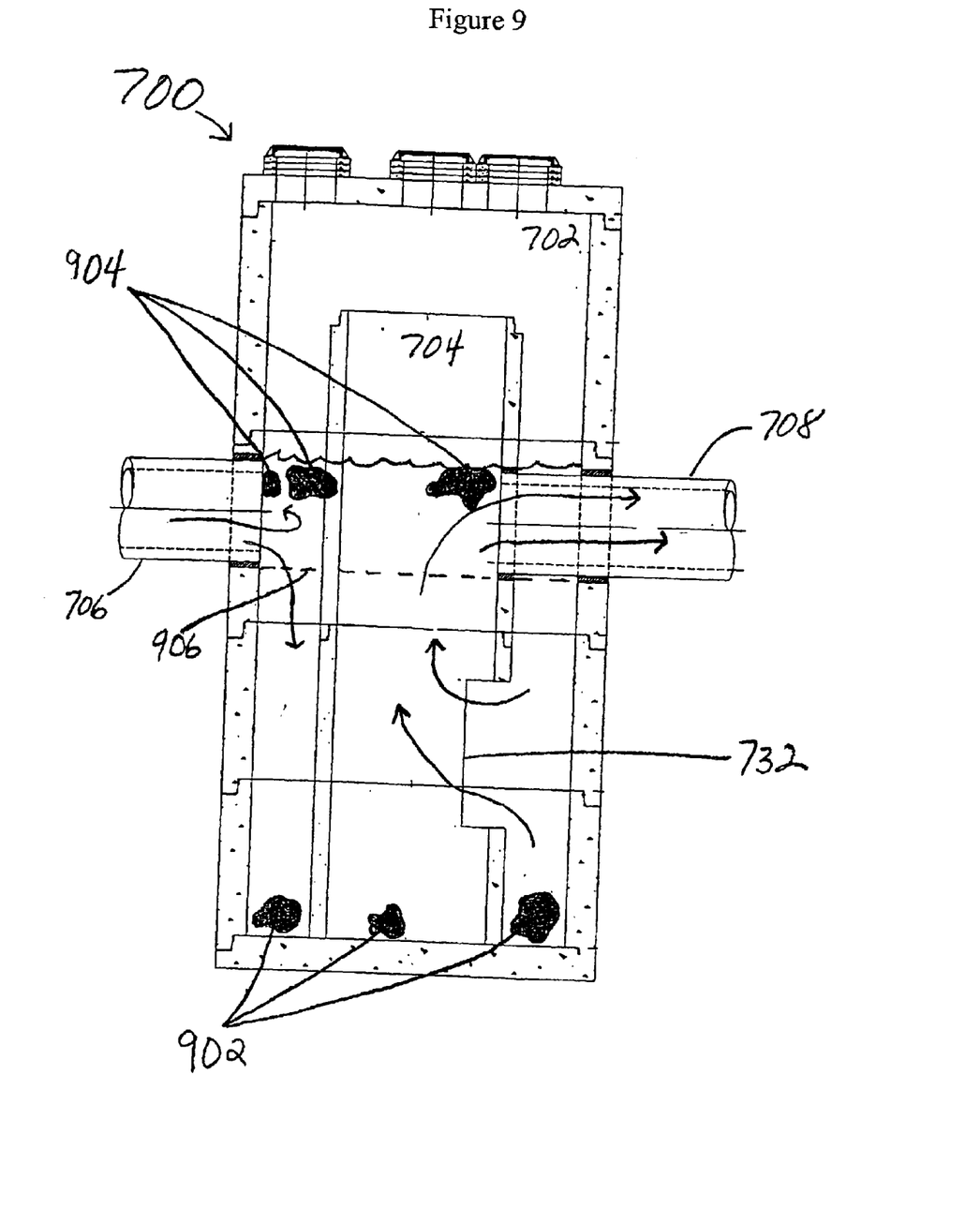
FIG. 9 is side cross-sectional view of the separation tank of FIG. 7 showing the device in use.

In use, as shown in FIG. 9, storm water or other fluid may enter through the inlet 706 into the outer chamber 702. As discussed above, the inner chamber 704 may be positioned such that it may be directly in front of the inlet 706. Thus, the portion of the inner chamber wall 712 opposite of the inlet 706 in the outer chamber 702 may act to redirect and dissipate flow energy, and the larger flow area of the outer chamber 702 will slow the velocity of the water. When a sufficient volume of water is in the outer chamber 702, the water may flow through the inner-chamber-wall-opening 732 where it may enter the inner chamber 704. The water then may flow upwards in the inner chamber 704 where it may exit the separation tank 700 through the outlet 708.

The separation tank 700 may trap particulate matter from the storm water (or other liquids depending on use) in the following manner. As the velocity of the water may be slowed upon entering the inner chamber 704, as discussed above, non-floating particulate matter 902 may sink to the floor 728 of the separation tank 700 in the outer chamber 702. As discussed above, the inner-chamber-wall-opening 732 may be located above the floor 728. Thus, the lower section 733 of the inner chamber wall 712 may prevent the non-floating particulate matter 902 from flowing into the inner chamber 704 and leaving the separation tank 700 through the outlet 708. Non-floating particulate matter 902 of any size may be filtered in this matter. Non-floating particulate matter 902 may, from time to time, enter the inner chamber 704 through the inner-chamber-wall-openings 732 as it sinks to the floor 728. This result may be limited with the placement of the inner-chamber-wall-opening 732 on the opposite side of the inner chamber 704 as the inlet 706, as described above. However, because of the slowed velocity of the water and the raised position of the outlet 708, this non-floating particulate matter 902 may generally sink to the floor of the inner chamber 704 and also may be trapped.

Floating particulate matter 904 may be trapped in the separation tank 700 in the following manner. Generally, the water level may be maintained between flow events at a low water level 906. As water enters the separation tank 700 at the inlet 706, floating particulate matter 904 may remain at or near the surface of the water in the outer chamber 702. As described above, the inner-chamber-wall-opening 732 may be located beneath the low water level 906 and beneath the outlet 708, and may be separated from each by the mid-section 734 of the inner chamber wall 712. Thus, the mid-section 734 of inner chamber wall 712 may prevent floating particulate matter 904 from entering the inner chamber 704 through the inner-chamber-wall-opening 732 and leaving the separation tank 700 through the outlet 708. Floating particulate matter 904 instead may remain in the outer chamber 702.

If obstruction prevents flow from the outer chamber 702 to the inner chamber 704 through the inner-chamber-wall-opening 732, the water may rise in the outer chamber 702 until it flows into the overflow opening 730 and to the inner chamber 704. Once in the inner chamber 704 the water then may be able to leave the separation tank 700 through the outlet 708, thus, bypassing the obstruction. Maintenance of the separation tank 700 to clear any obstruction or accumulated particulate matter may be completed through the access openings 744, 746. As stated, a center access opening 744 may be provided to allow more direct access to the inner chamber 704. One or more other secondary access openings 746 may be provided along the periphery of the cover 742 to provide more direct access to the outer chamber 702.

Therefore, the foregoing is considered as illustrative only of the principles of the invention. The features and aspects of the present invention have been described or depicted by way of example only and are therefore not intended to be interpreted as required or essential elements of the invention. It should be understood that the foregoing relates only to certain exemplary embodiments of the invention, and that numerous changes and additions may be made thereto without departing from the spirit and scope of the invention as defined by any appended claims.

I claim:

1. A separation tank, comprising:

an outer chamber;

an inner chamber positioned within said outer chamber;

an inlet, wherein said inlet is in communication with said outer chamber;

an outlet, wherein said outlet is in communication with said outer chamber;

said inner chamber comprising a first opening and a second opening;

said first opening providing access between said inner chamber and said outer chamber; and an inlet channel, said inlet channel extending between said inlet to said second opening in said inner chamber.

2. The separation tank of claim 1, further comprising a floor and wherein said inner chamber and said outer chamber are positioned on said floor.

3. The separation tank of claim 2, further comprising a plurality of lower baffles positioned between said outer chamber and said inner chamber and adjacent to said first opening.

4. The separation tank of claim 3, further comprising a plurality of upper baffles positioned between said outer chamber and said inner chamber and adjacent to said outlet.

5. The separation tank of claim 1, wherein said outer chamber comprises a cylinder.

6. The separation tank of claim 5, wherein said inner chamber comprises a cylinder.

7. The separation tank of claim 1, wherein said inlet, said second opening, and said outlet comprise a first position range, wherein said first opening comprises a second position range, and wherein said first position range is higher than said second position range.

8. The separation tank of claim 2, wherein said first opening is adjacent to said floor.

9. The separation tank of claim 1, wherein said inlet, said second opening, and said outlet are each separated from said first opening by at least a mid-section of said inner chamber.

10. The separation tank of claim 1, wherein said first opening comprises a substantially rectangular shape.

11. The separation tank of claim 3, wherein said plurality of lower baffles are affixed to said floor and extend higher than said first opening.

12. The separation tank of claim 11, wherein said plurality of lower baffles flank said first opening so as to form a first basin between said inner chamber and said outer chamber.

13. The separation tank of claim 4, wherein said plurality of upper baffles are separated from said floor by a predetermined distance and extend higher than said outlet.

14. The separation tank of claim 13, wherein said plurality of upper baffles flank said outlet so as to form a second basin between said inner chamber and said outer chamber.

15. The separation tank of claim 1, wherein said inlet channel comprises a lower section of a horizontal running pipe.

16. The separation tank of claim 1, wherein said outer chamber comprises a plurality of hollow cylindrical segments.

17. The separation tank of claim 1, wherein said inner chamber comprises a plurality of hollow cylindrical segments.

18. The separation tank of claim 1, wherein said outer chamber comprises a removable lid.

19. The separation tank of claim 1, wherein said outer chamber comprises a first height, wherein said inner chamber wall comprises a second height, wherein said first height is greater than said second height; and wherein said inner chamber is open.

20. A separation tank, comprising:
   an outer chamber;
   an inner chamber positioned within said outer chamber;
   an inlet, wherein said inlet is in communication with said inner chamber;
   an outlet, wherein said outlet is in communication with said outer chamber; and
   said inner chamber comprising an inner-chamber-wall-opening, said inner-chamber-wall-opening providing access between said inner chamber to said outer chamber;
   wherein said inner chamber comprise a plurality of hollow cylindrical segments.

21. The separation tank of claim 20, wherein said outer chamber comprises a cylinder.

22. The separation tank of claim 20, wherein said inner chamber comprises a cylinder.

23. The separation tank of claim 20, further comprising a floor and wherein said inner chamber and said outer chamber are positioned on said floor.

24. The separation tank of claim 20, wherein said inlet and said outlet comprise a first position range, wherein said inner-chamber-wall-opening comprises a second position range, and wherein said first position range is higher than said second position range.

25. The separation tank of claim 23, wherein said inlet and said outlet are each separated from said inner-chamber-wall-opening by at least a mid-section of said inner chamber.

26. The separation tank of claim 25, wherein said inner-chamber-wall-opening is separated from said floor by at least a lower-section of said inner chamber.

27. The separation tank of claim 20, wherein said inner-chamber-wall-opening comprises a plurality openings and wherein two of said plurality of said inner-chamber-wall-openings oppose each other across said inner chamber.

28. The separation tank of claim 27, wherein each of said plurality of inner-chamber-wall-openings comprises a substantially circular shape.

29. The separation tank of claim 27, wherein said two of said plurality of inner-chamber-wall-openings comprise a first axis, wherein said inlet and said outlet comprise a second axis, and wherein said first axis and said second axis are substantially perpendicular.

30. The separation tank of claim 20, wherein said outer chamber comprises a plurality of hollow cylindrical segments.

31. The separation tank of claim 20, wherein said outer chamber comprises a removable lid.

32. The separation tank of claim 20, wherein said outer chamber comprises a first height, wherein said inner chamber wall comprises a second height, wherein said first height is greater than said second height; and wherein said inner chamber is open.

33. A separation tank, comprising:
   an outer chamber;
   an inner chamber positioned within said outer chamber;
   an inlet, wherein said inlet is in communication with said outer chamber;
   an outlet, wherein said outlet is in communication with said inner chamber; and
   said inner chamber comprising an inner-chamber-wall-opening, said inner-chamber-wall-opening providing access between said inner chamber to said outer chamber.

34. The separation tank of claim 33, wherein said outer chamber comprises a cylinder.

35. The separation tank of claim 33, wherein said inner chamber comprises a cylinder.

36. The separation tank of claim 33, further comprising a floor and wherein said inner chamber and said outer chamber are positioned on said floor.

37. The separation tank of claim 33, wherein said inlet and said outlet comprise a first position range, wherein said inner-chamber-wall-opening comprises a second position range, and wherein said first position range is higher than said second position range.

38. The separation tank of claim 36, wherein said inlet and said outlet are each separated from said inner-chamber-wall-opening by at least a mid-section of said inner chamber.

39. The separation tank of claim 38, wherein said inner-chamber-wall-opening is separated from said floor by at least a lower-section of said inner chamber.

40. The separation tank of claim 33, wherein said inner-chamber-wall-opening comprises a substantially rectangular shape.

41. The separation tank of claim 33, wherein said inner chamber comprises a first side and a second side and wherein said inner-chamber-wall-opening comprises said first side and said inlet faces said second side.

42. The separation tank of claim 33, wherein said outer chamber comprises a plurality of hollow cylindrical segments.

43. The separation tank of claim 33, wherein said inner chamber comprises a plurality of hollow cylindrical segments.

44. The separation tank of claim 33, wherein said outer chamber comprises a removable lid.

45. The separation tank of claim 33, wherein said outer chamber comprises a first height, wherein said inner chamber wall comprises a second height, wherein said first height is greater than said second height; and wherein said inner chamber is open.

* * * * *